March 21, 1961  J. W. McGUFFEY  2,975,614
MOBILE REFRIGERATION SYSTEM
Filed Jan. 8, 1958  5 Sheets-Sheet 1

INVENTOR.
JAMES W. McGUFFEY
BY Whittemore, Hulbert & Belknap
ATTORNEYS

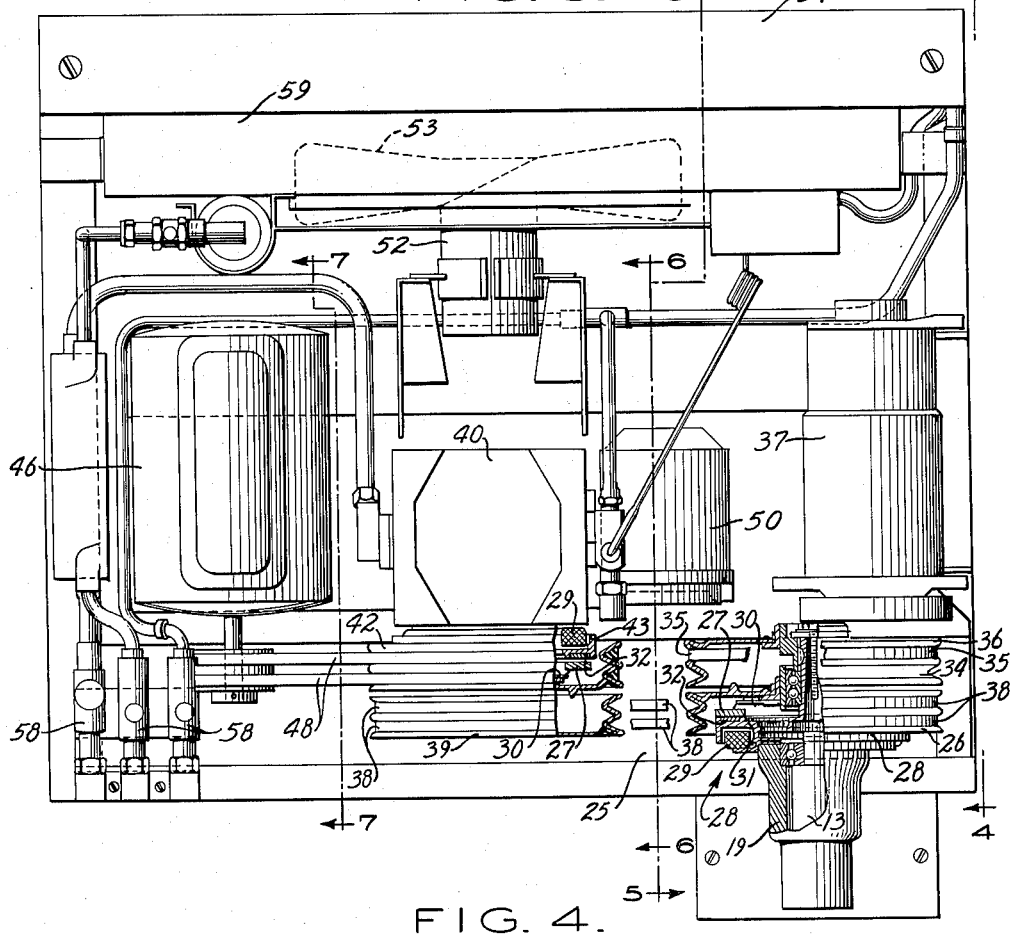
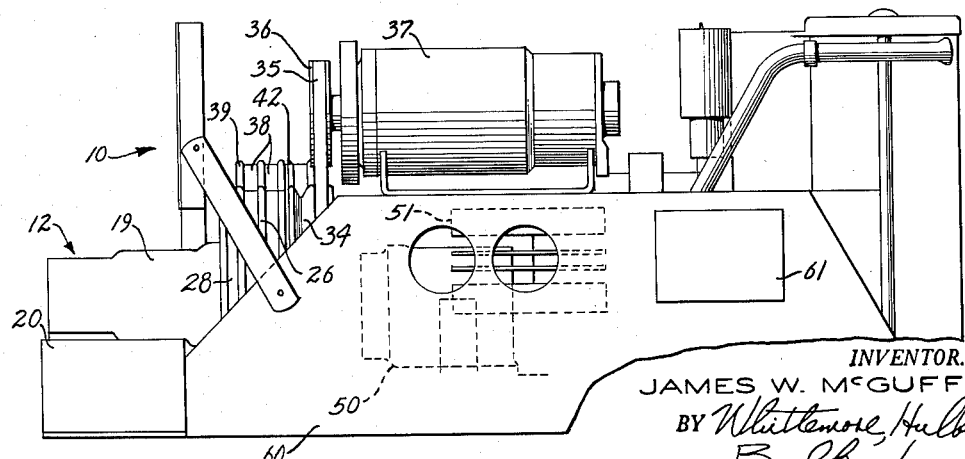

March 21, 1961   J. W. McGUFFEY   2,975,614
MOBILE REFRIGERATION SYSTEM

Filed Jan. 8, 1958   5 Sheets-Sheet 3

INVENTOR.
JAMES W. McGUFFEY
BY Whittemore, Hulbert &
Belknap
ATTORNEYS

March 21, 1961     J. W. McGUFFEY     2,975,614
MOBILE REFRIGERATION SYSTEM
Filed Jan. 8, 1958     5 Sheets-Sheet 4

INVENTOR.
JAMES W. McGUFFEY
BY *Whittemore Hulbert &*
*Belknap*
ATTORNEYS

March 21, 1961  J. W. McGUFFEY  2,975,614
MOBILE REFRIGERATION SYSTEM
Filed Jan. 8, 1958  5 Sheets-Sheet 5
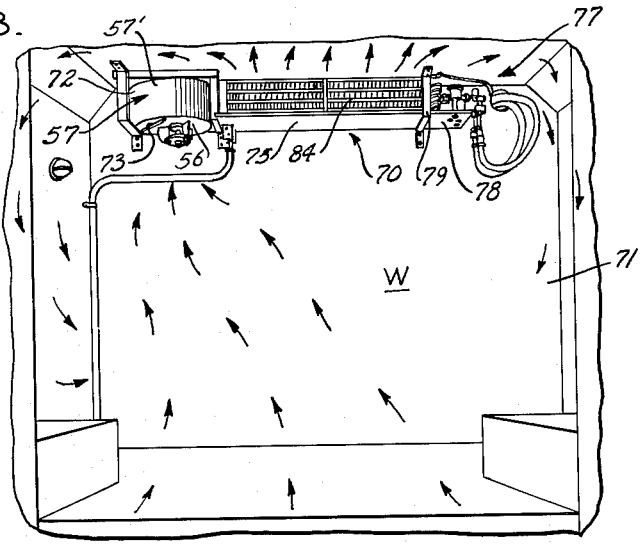
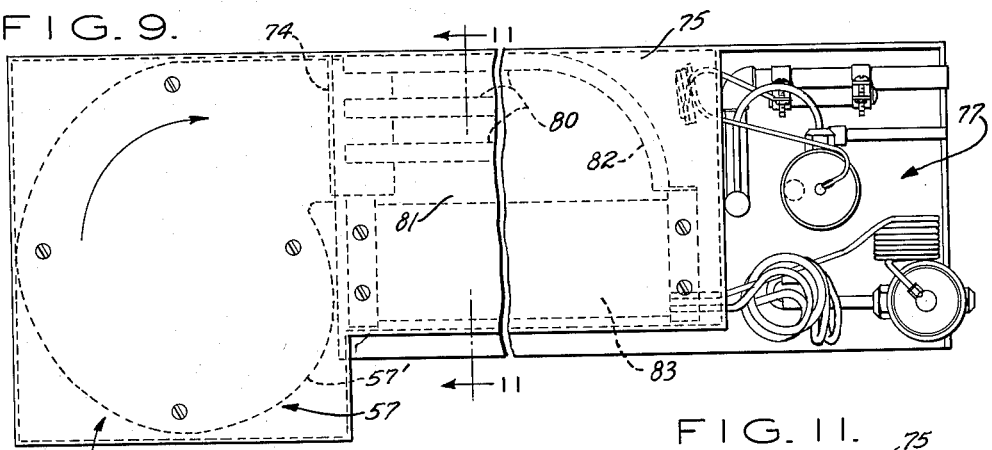
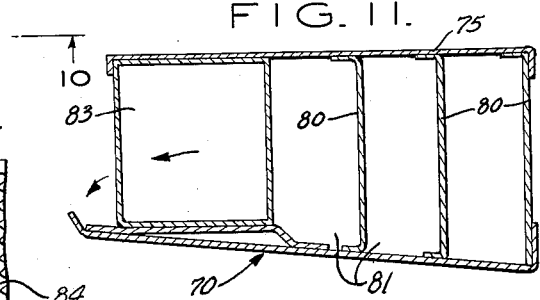
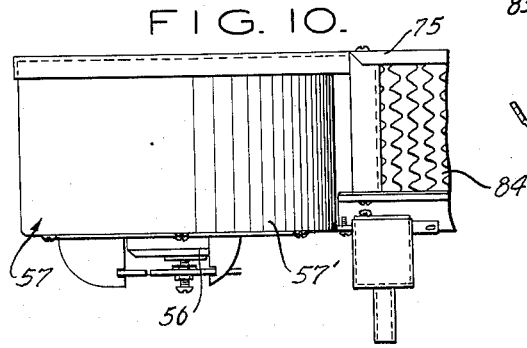
INVENTOR.
JAMES W. McGUFFEY
BY *Whittemore, Hulbert & Belknap*
ATTORNEYS

United States Patent Office 2,975,614
Patented Mar. 21, 1961

2,975,614

MOBILE REFRIGERATION SYSTEM

James W. McGuffey, Lansing, Mich., assignor to Tranter Manufacturing, Inc., Lansing, Mich., a corporation of Michigan Filed Jan. 8, 1958, Ser. No. 707,810

7 Claims. (Cl. 62—230)

The present invention relates to a refrigeration system or unit for a vehicle such as a refrigerated truck. As illustrated herein the system is embodied in a typical installation in a so-called retail milk truck of the general type illustrated and described in the patent to Ryan et al. 2,636,356; and in certain mechanical aspects, the equipment of the invention is particularly devised for this type vehicle. However, in its broader aspects as a refrigeration system the invention is in no wise limited to this special setting, but is on the contrary applicable to mobile installations of various sorts.

It is a general object of the invention to provide refrigeration equipment of the type described which is extremely compact, adapted to occupy a minimum space in the driver's compartment of a retail truck or like vehicle. It is also very conveniently and economically installed, as well as readily accessible for servicing, if required. The arrangement is such that maximum condenser and evaporator fan capacity is possible for a limited available space.

Another object is to provide a system as described, in which the design of the evaporator unit, as disposed in a van or like compartment to be refrigerated, is such that it also occupies an absolute minimum of pay load space.

In reference to the invention as it applies generally to equipment performing a standard refrigeration cycle, it is a general object to provide a system of the type which derives its power for over-the-road operation from the vehicle itself. More particularly, the drive is taken from the engine crank shaft and is applied to the compressor and a mobile generator through a novel double electrical clutch arrangement.

Still more specifically, an object is to provide a refrigeration system in which an electric generator of the system, mechanically driven by the vehicle or by its motion in over-the-road operation, serves as a source of electrical control energization for a first clutch of the dual clutch arrangement referred to above. The generator also acts to power the condenser and evaporator fan motors in over-the-road service; while a stand-by motor energized from an external A.C. power line is provided to drive the compressor during layover. The first clutch referred to decouples the compressor from the engine drive source in this phase.

More particularly, in accordance with the invention, the same source of external A.C. voltage which operates the stand-by motor is employed, through the agency of suitable transformer and rectifier means, to control the second electrically controlled clutch of the dual clutch connection. It is by this second clutch that the stand-by motor is connected to the compressor in layover operation, being decoupled from the compressor during the over-the-road phase.

A system in which the rectified voltage from the external electrical stand-by source is utilized, as described, to operate the motors of the evaporator and condenser of the system during layover, makes available for driving the compressor all the rated horsepower of a stand-by motor direct operated from that source.

In accordance with a still further object, the wiring of the system includes appropriate on-off switch and interlock relay provisions to prevent energization and engagement of either electric clutch while the other is energized. Since only one clutch can be actuated at a time, possible damage to the vehicle engine due to an excessively high free speed of the sand-by motor is prevented and, by the same token, possibly damaging over-drive of the motor by the engine connection is impossible.

In accordance with a further specific object, the evaporator of the system is of an improved type, featuring an improved ducted type coil housing imposing minimum resistance to air flow, which housing is arranged in the refrigerated compartment to produce the most efficient flow of cold air in relation to the load. As indicated above, it also consumes an absolute minimum of pay load space.

Generally considered, the invention aims to incorporate all of the advantageous high and low side features severally discussed above in a mobile refrigeration system of great compactness and efficiency.

Other objects and features of the invention will become apparent as the description proceeds, especially when taken in conjunction with the accompanying drawings, wherein:

Fig. 3 is a top plan view, partially broken away and in horizontal section, of driving and high side components of the system appearing in Fig. 1;

Figure 12:
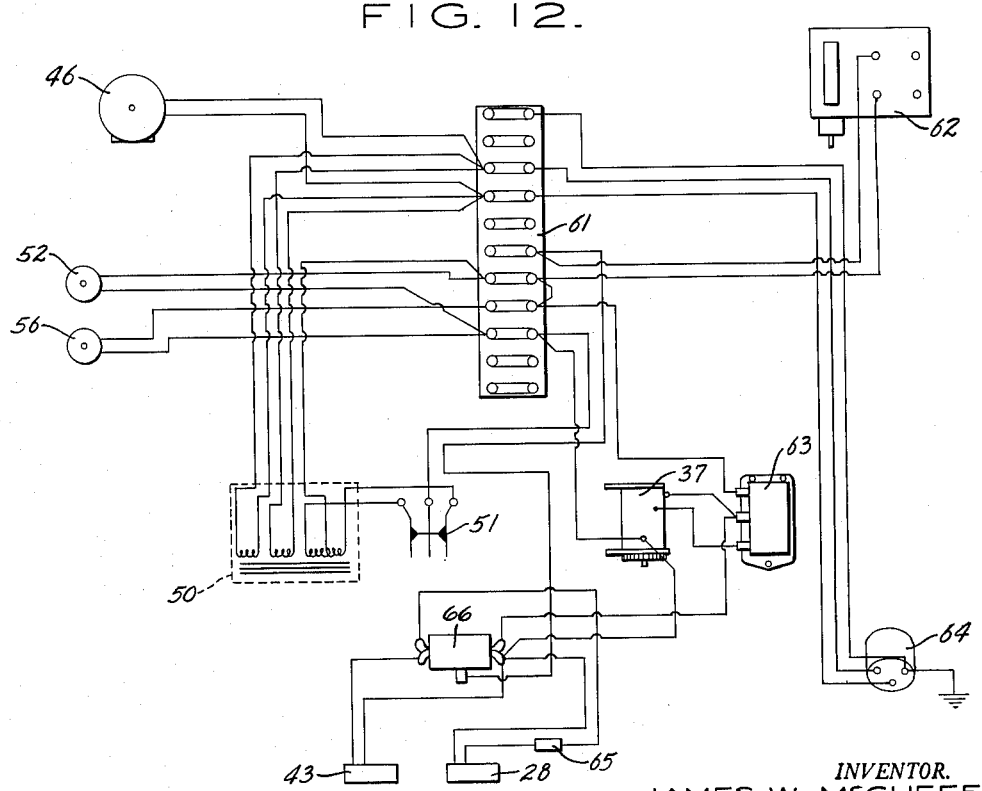

Figs. 4, 5, 6 and 7 are views in vertical section, in planes paralleling the direction of travel of the vehicle, being taken along lines 4—4, 5—5, 6—6 and 7—7, respectively, of Fig. 3;

Fig. 8 is a fragmentary view of the improved evaporator of the system as installed in the refrigerated van compartment, as viewed from the rear loading door opening to the compartment;

Fig. 9 is a top plan view of the evaporator unit, broken away;

Fig. 10 is a fragmentary view of the evaporator in rear elevation, i.e., as viewed from line 10—10 of Fig. 9;

Fig. 11 is a vertical section on line 11—11 of Fig. 9 showing structure of the improved ducted air coil housing of the evaporator; and Fig. 12 is a schematic wiring diagram showing the basic components of the improved system and electrical operating connections therefor.

Figure 1:
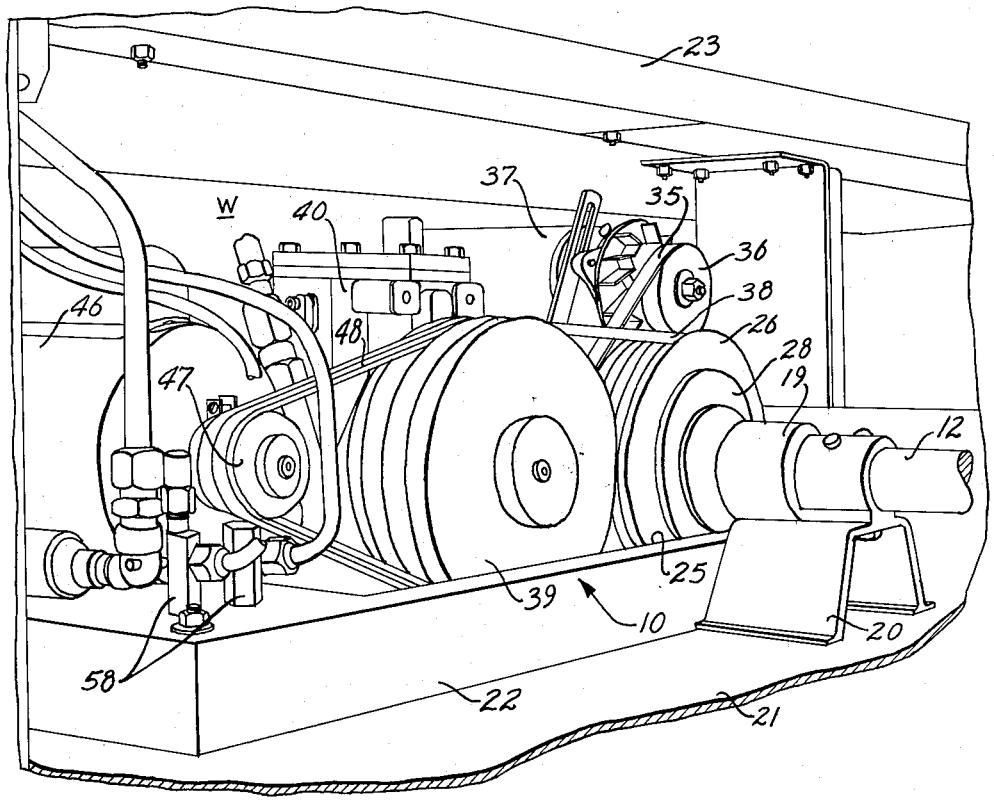
Fig. 1 is a fragmentary perspective view, partially broken away, showing a typical installation of mechanical driving and high side instrumentalities of the refrigeration system in the driver's compartment of a conventional retail milk truck, as viewed from the righthand or curb side of the compartment.
Figure 2:
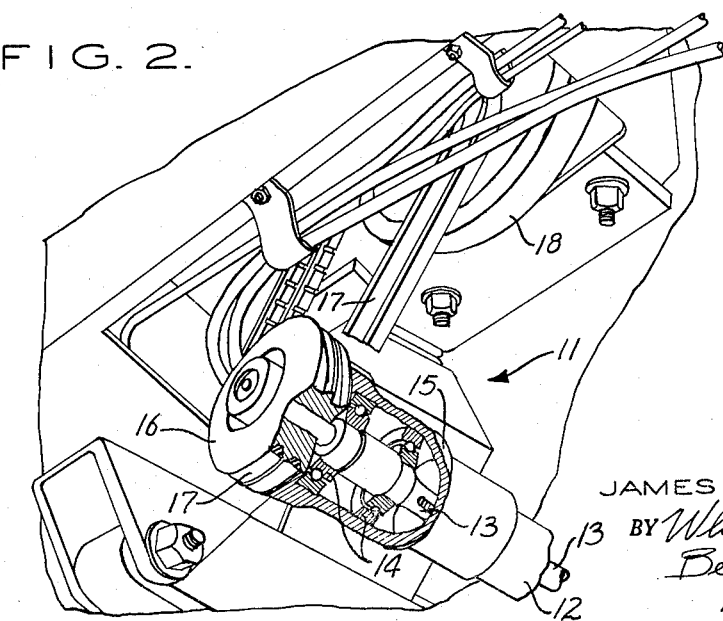
Fig. 2 is a fragmentary bottom perspective view, partially broken away and in longitudinally section, of the connecting belt and flexible shaft drive means which mechanically couple the system to the vehicle engine.

As generally shown in Figs. 1, 2 and 3 of the drawings, the reference numeral 10 designates an assembly composed of high side, mechanical driving and control components of the system, which assembly is mounted within the operator's compartment of an automotive retail milk truck, of the general type shown in the Ryan et al. patent identified above.

The reference numeral 11 (Fig. 2) designates an outer, sub-engine, belt driven unit by which the assembly 10 is driven from the engine crank shaft. Unit 11 comprises an elongated flexible shaft 12 extending lengthwise of the vehicle and beneath the engine thereof, the internal driving cable element 13 of this conventional type shaft being appropriately journaled by ball bearings 14 in the fixedly mounted shaft housing 15. A double pulley 16 is secured on the forward end of the cable 13, and belts 17 drivingly connect it to the crank shaft of the engine, as at the usual crank shaft pulley 18.

As illustrated in Figs. 1 and 3, the flexible shaft 12 is brought rearwardly within and adjacent the floor of the operator's compartment and its rear terminal cable or shaft housing 19 is fixedly anchored therein, as by a rigid base bracket 20 secured to the cab floor plate 21.

The high side assembly 10 is rigidly mounted upon a floor base 22 fabricated of channel-like sections for maximum rigidity and soundness, and is compactly disposed beneath the usual transverse horizontal shelf 23 within the driver's compartment or cab of the truck.

Referring now to Figs. 3 through 7, in conjunction with Fig. 1, the rear end of internal driving cable 13 of flexible shaft 12 has ball bearing-mounted thereon, immediately within a recess 25 of the base 22 provided to accommodate it (Fig. 1), a double sheave pulley 26, which pulley has secured to it the driven rotor or rotary armature 27 of an electrically or magnetically controlled clutch, generally designated 28. This clutch is entirely conventional in nature. Its coil 29 is fixed, being suitably secured concentrically to the shaft or cable housing 19. The armature 27 is drivingly connected by flexible drive arms 30 with the hub of pulley 26. A driven disk 31 of the clutch rotates with shaft cable 13 and when coil 29 is energized it draws armature against the friction element 32 on the disk 31 thus drivingly coupling pulley 26 to the flexible cable 12.

A flexible shaft-connected clutch device of this general sort is illustrated and described in the copending application of Orton S. McGuffey and James W. McGuffey, Serial No. 533,618, filed September 12, 1955, now U.S. Letters Patent No. 2,880,595, dated April 7, 1959.

A further double sheave pulley 34, concentric and outboard in relation to the clutch pulley 26, is fixed on the rear end of the driving cable 13, and one of the sheaves of this pulley is upwardly connected by a flexible belt 35 with a pulley 36 secured on the shaft of a conventional automotive electrical generator 37 mounted on the floor base 22. Thus generator 37 is at all times belt connected for drive by the flexible shaft 12 in over-the-road operation.

A pair of belts 38 drivingly connect the clutch carried pulley 26 with a similar double sheave pulley 39 fixed on the outer end of the driving shaft of a conventional refrigerator compressor 40. The compressor is located on base 22 in laterally spaced relation to the generator coupling clutch 28, with its shaft paralleling the latter. A further like coaxial double sheave pulley 42 is connected to the rotary armature of a second electrically or magnetically controlled clutch 43 identical with the clutch 28, in the same way that the shaft-to-compressor drive pulley 26 is mounted to the clutch 28.

Corresponding reference numerals designate corresponding parts of clutches 28 and 43 in Fig. 3, and it is seen that with the former electrically energized and the latter deenergized the flexible shaft 12 drives the generator 37 positively (through shaft pulley 34, belt 35 and generator pulley 36). It also drives the compressor 40 positively (through clutch 28, pulley 26, belts 38 and pulley 39). With the flexible shaft idle on layover the generator is idle and clutch 28 is deenergized to decouple the compressor from the engine as a prime mover. Clutch 28 is controlled by a thermally responsive on-off switch (to be described) governing energization of the clutch coil 29 by the output of generator 37.

The reference numeral 46 generally designates an electric stand-by motor mounted on the floor base 22. This motor is energized from a standard A.C. source designated 64 (Fig. 12) and its shaft has secured thereon a pulley by which it is drivingly connected by belts 48 with the clutch-borne pulley 42 at the compressor 40.

The compressor driving pulley 39 is fixed on the shaft of the compressor and pulley 42 is coupled mechanically to that shaft by the armature 27 of clutch 43, but only upon energization of its coil 29, in the same manner as the clutch 28.

The same A.C. source which energizes the stand-by motor 46 is also wired to a stepdown transformer 50 (Fig. 5) the output of which is applied to a conventional rectifier 51, so as to afford a rectified D.C. potential of appropriate voltage and current values. This is employed to drive the motor 52 (Fig. 3) for the fan 53 of the condenser 54 of the system, the motor 56 for the fan 57 of the evaporator (Figs. 9 and 12), and also to control the compressor connected clutch 43. In a similar way, and as appears in Fig. 12, the generator 37 is connected electrically to the condenser fan motor 52, the evaporator fan motor 56 and also to the other or over-the-road clutch 28 to lock in the drive for the compressor 40 from the flexible shaft 12.

It is seen by the above that the provision for a rectified fan energizing and clutch control voltage from the external A.C. source leaves available for mechanically driving the compressor 40, in the stand-by or layover phase, all of the rated horsepower of the motor 46. This appreciably increases the capacity of the installation per rated horsepower.

As appears from Fig. 1, the high side or condenser portion of the system is physically small, compact and efficiently occupies unusable space normally wasted in a retail milk truck. This space is below the shelf in the driver's compartment and to the rear of the driver, and the arrangement is such that it provides a relatively straight disposition of the flexible shaft from front to rear. The base 22 mounts with a relatively few hold-down bolts to the floor plate 21.

As indicated in Figs. 1 and 3, the valves 58 which connect refrigerant lines from the condenser to the evaporator (to be described) are conveniently located on the front of the assembly or unit 10 for easy disconnection in case of needed servicing. Condenser fan 53 is so placed in its housing 59 as to have maximum capacity, throwing out air in a radial manner for maximum condensing action over the complete coil of the condenser.

Figure 5:
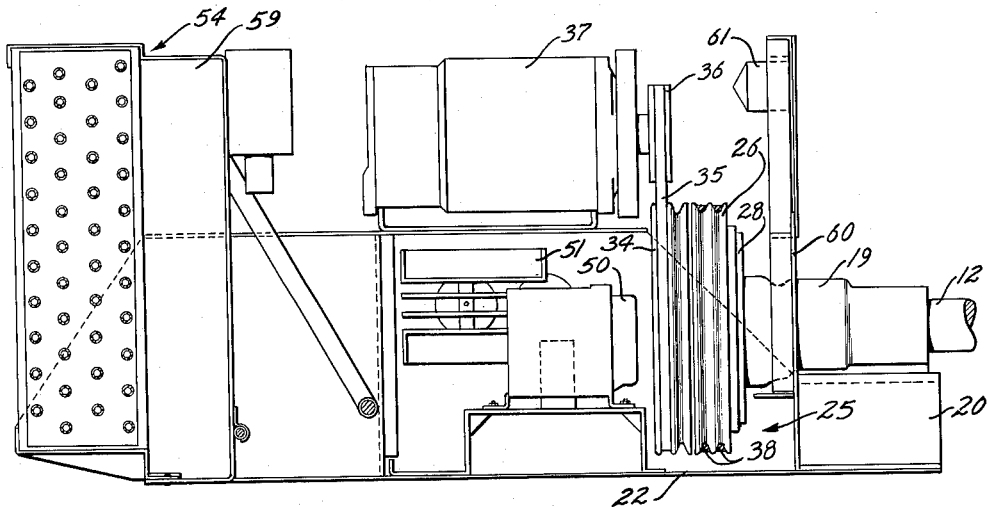
Figure 6:
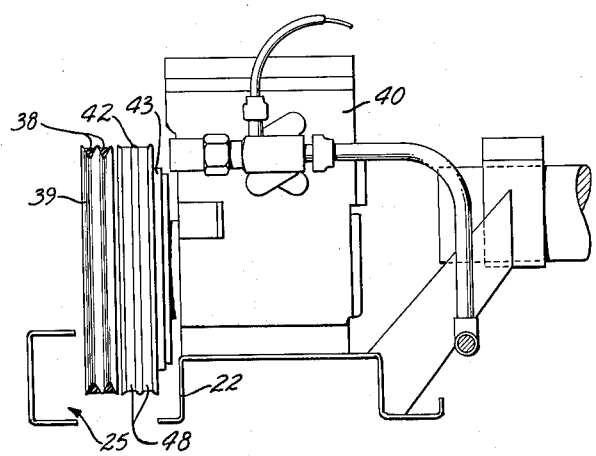
Figure 7:
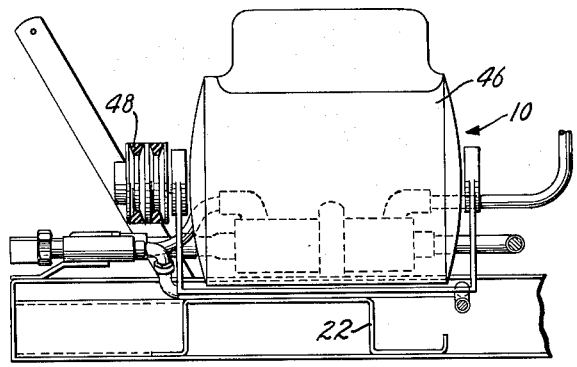

As appears in Figs. 4 and 5, the high side assembly 10 may be partially enclosed at its forward side by an upright sheet metal screen guard 60 suitably secured on the floor base 22. A switch and stand-by plug-in panel 61 is supported in a convenient position on screen guard 60. Wiring outlets are concentrated at the panel 61 (schematically shown in Fig. 12) for convenience and simplicity.

Referring now to Fig. 12, the system includes conventional elements or units not especially germane to the operation of the system as it is affected by the invention. These include a refrigerant pressure control unit 62 and a voltage and current regulator 63 for generator 37. The A.C. voltage source is depicted as a grounded single phase receptacle 64 mounted on panel 61 as mentioned above and adapted to be energized from a standard 115 volt A.C. line. The system may also be powered electrically from a polyphase stand-by line of higher rating.

The numeral 65 in Fig. 12 designates an off-on or shut-off switch controlling the flow of current through the over-the-road or flexible shaft clutch 28. Both electrical currents involved in the operation, i.e., that generated by generator 37 and that supplied by the rectifier-transformer unit 50—51 are controlled through an electrical interlock relay unit 66, in such manner that when one clutch 28 or 43 is engaged, the other is disengaged, and cannot be engaged, and vice versa. Thus, the over-the-road shaft clutch 28 and the stand-by motor clutch 43 will not be energized at the same time, in the event the refrigerating unit is plugged in at 64 on stand-by and the truck engine is at the same time running and driving shaft 12. Moreover, it is impossible to cause damage to the engine under a too high free speed of operation of the electric motor in stand-by, and impossible to damage the motor by overspeed reverse driving. Relay 66 is a standard Delco-Remy product, part number 1118797, and its coil (not shown) is connected to the generator 37 in such manner that any time the generator is operating the relay 66 switches energization to the over-the-road clutch 28.

In the operation of the above described system, in the over-the-road phase, with switch 65 closed flexible shaft 12 is belt driven from the vehicle engine at its forward pulley 16, the clutch 28 at its rear being locked in so that shaft 12 drives the pulley 26 with the pulley 34. The belts 38 then drive the compressor 40 through its fixedly connected pulley 39, as well as driving the generator 37 through the continuously effective belt and pulley connection 34, 35 and 36, thus to power the fan motors 52 and 56. Relay 66 maintains the compressor clutch 43 disengaged in this phase.

In stand-by operation, the switch 65 is opened to de-energize clutch 28 and disconnect pulley 26 and compressor pulley 39 from flexible shaft 12. With the system energized from voltage source 47, relay 66 causes compressor clutch 43 to engage and compressor 40 is now driven by motor 46 through belts 48 and pulley 42.

The motors 52, 56 driving the fan 53 of the condenser 54 and the fan or blower of the evaporator unit (hereinafter described) are direct current energized in the standby operation by a rectified A.C. voltage furnished through stepdown transformer 50 and rectifier unit 51.

The refrigeration cycle performed by compressor 40, condenser 54, expansion valve, evaporator, etc. of the system is a conventional one, hence it is not deemed necessary to describe conventional refrigerant circulatory provisions connecting these components, although they appear in the drawings. Similarly, it is believed that the wiring diagram of Fig. 12 is self-explanatory as to the operating connections, once the operating relationship of the electrical clutches 28, 43 in the over-the-road and the stand-by phases is understood.

The evaporator or low side assembly of the system is shown in Figs. 8 through 11 of the drawings. It is generally designated by the reference numeral 70 and comprises a very compact unit mounted in the truck or like compartment 71 to be refrigerated, which has appropriate door structure (not shown) at its rearwardly facing loading opening, from which Fig. 8 is viewed. As shown, the evaporator unit 70 is mounted in a zone of small horizontal and vertical dimension at the forward ceiling area of the compartment 71, occupying an absolute minimum of pay load space.

The reference numeral 72 designates a strap metal bracket appropriately secured to the forward wall and ceiling of the compartment 71 and supporting the convolute casing or housing 57' of evaporator fan 57. This housing has a downwardly facing air intake opening 73 of substantial size, in which the fan motor 56 is disposed and appropriately supported. The housing 72 is secured to and discharges tangentially and laterally at 74 into a transversely elongated, ducted evaporator coil housing 75.

Other low side components associated with the evaporator 70, such as an expansion valve, heat exchanger, and the like, generally designated by the reference numeral 77, are grouped and mounted upon a lateral extension plate 78 on the bottom of the coil housing, at the end thereof opposite the fan housing 57. A suitable bracket 79 mounts this portion of the evaporator unit 70 to the forward wall and ceiling of the compartment 71.

The housing portions 72, 75 are of sheet metal construction, and the coil housing 75 is equipped with internal vertically disposed duct partitioning elements 80 of sheet metal. These duct partitions are spaced equally in the front-to-rear sense to provide three separated transverse air flow passages 81, and the duct members 80 are of unequal length and have rearwardly curved termini 82, whereby air from the fan is discharged rearwardly into a coil receiving chamber 83 (the coils being omitted for simplicity). The chamber 83 in turn discharges rearwardly through a louvered grill 84 into the compartment 71.

An evaporator or blower unit 70 is thus provided in which the ducted interior of the coil housing 75 directs air past the coil (not shown) for minimum resistance to flow and maximum efficiency. The air has a pattern of flow from its upward intake to fan housing 72, transversely outwardly through the coil housing 75, discharging in uniform distribution across the coil section, then over and down through the load, as depicted by arrows in Fig. 8, from the housing 75 along the ceiling and down the side walls, as well as down through the middle of the load space. A wall and ceiling envelope of cold air has the effect of driving the circulatory air into the load in compartment 71. The location of the air intake causes a minimum loss of cold air at the rear or street side corner of the cooling compartment 71. It has been found that the blower unit 70 has remarkable pull-down characteristics.

It will be appreciated from the foregoing that the invention affords a refrigerating system of great compactness, both as to its high side assembly 10 disposed in a rear floor space of the cab of a retail type truck, beneath the shelf 23 thereof and directly against the cab rear wall. This may be considered the insulated forward wall W of the refrigerated compartment 71 (Fig. 8), against a top transverse zone of which wall the low side assembly 70 is disposed.

Whether the evaporator assembly 70 alone of the improved system is employed, as in an installation other than a retail truck type, or in an installation of that type as herein shown, it is evident that equivalent advantages will be had in respect to low consumption of pay load space, coupled with maximum output capacity and optimum efficiency of distribution of refrigerated air.

What I claim as my invention is:

1. In a refrigeration system for a vehicle, a vehicle driven shaft, a compressor unit, an electrical generator unit, a stand-by motor, means connecting said generator unit with said shaft and said compressor unit with said shaft and motor for selective drive thereby, including an electrically controlled clutch in each of a pair of driving connections from said motor and shaft to said compressor unit, electrical means including an electrically actuated interlock relay device operatively connected to and controlling said clutches for the mutually exclusive drive of said compressor unit by said motor, or of said compressor unit along with said generator unit by said shaft, a source of electrical power for said motor, and means including a rectifier connecting said source with the clutch in the driving connection from said motor to said compressor unit.

2. In a refrigeration system for a vehicle, a vehicle driven shaft, a compressor unit, an electrical generator unit having electrical components, condenser and evaporator units connected for electrical energization by said generator unit, a standby motor, means connecting said generator unit with said shaft and said compressor unit with said shaft and motor for selective drive thereby, including an electrically controlled clutch in each of a pair of driving connections from said motor and shaft to said compressor unit, means electrically connected with said motor and clutches for the mutually exclusive drive of said compressor unit by said motor, or of said compressor unit along with said generator unit by said shaft, including a source of power for said motor, and an electrically actuated interlock relay device operatively connecting said source independently of said motor with said clutches, and step-down transformer means electrically connected between said source and said respective electrical components of the condenser and evaporator units.

3. Mobile refrigeration apparatus for installation on a vehicle characterized by a forward operator's cab and a refrigerated load compartment rearwardly separated from said cab by a forward wall, comprising an assembly of compressor, condenser, stand-by motor, and electrical generator units disposed in a rear floor zone of said cab, a vehicle driven shaft drivingly connected to said generator unit, a first drive connection between said shaft and compressor unit, including an electrical clutch, a second drive connection including an electrical clutch between said stand-by motor and said compressor unit, and an evaporator assembly including an electrically energized fan unit and a housing disposed in said load compartment to extend transversely across the same in a zone at the top of said forward wall and immediately beneath the ceiling of said compartment, said fan and condenser units each including an electrical motor adapted to be energized by said generator unit, a source of electrical power for said stand-by motor, and an electrical circuit to selectively connect said fan and condenser motors and said clutches with said generator unit or said source, for over-the-road or stand-by operation, respectively, including a relay unit controlling energization of said clutches in alternation.

4. Apparatus in accordance with claim 3, in which said source is an alternating current source, said fan and condenser motors being direct current energized, and in which said electrical circuit includes a rectifier between said source and said last named motors and the clutch of said second compressor drive connection.

5. Mobile refrigeration apparatus for installation on a vehicle characterized by a forward operator's cab and a refrigerated load compartment rearwardly separated from said cab by a forward wall, comprising an assemby of compressor and electrical generator unit disposed in a rear floor zone of said cab, and an evaporator assembly including an electrically energized fan unit and a housing disposed in said load compartment to extend transversely across the same in a zone at the top of said forward wall and immediately beneath the ceiling of said compartment, said fan unit having a bottom air intake and said housing laterally adjoining said fan and discharging horizontally and rearwardly over a substantial transverse distance across said wall, said housing being provided with internal upright duct subdividing members of unequal length extending along the length of the housing in front-to-rear spaced relation to one another, said duct subdividing members having rearwardly curved ends differently spaced from said fan unit to discharge air rearwardly and horizontally in uniform distribution along said housing.

6. An evaporator assembly for installation at a forward wall of a refrigerated load compartment of a vehicle, comprising a fan unit and a housing at an end of said fan unit to which said unit discharges laterally, said fan unit and housing being adapted to be disposed in said load compartment to extend transversely and end-to-end across the same in a linear zone at the top of said forward wall and immediately beneath the ceiling of said compartment, said fan unit having a bottom air intake and said housing laterally adjoining said fan unit and being formed and proportioned to discharge horizontally and rearwardly away from and over a substantial transverse distance across said wall, said housing being provided with internal upright duct subdividing members of unequal length extending along the length of the housing in front-to-rear spaced relation to one another, said duct subdividing members having rearwardly curved ends differently spaced from said fan unit and disposed to discharge air rearwardly and horizontally in uniform distribution along said housing.

7. An evaporator assembly for installation at a forward wall of a refrigerated load compartment of a vehicle, comprising a fan unit and a housing at an end of said fan unit to which said unit discharges laterally, said fan unit and housing being adapted to be disposed in said load compartment to extend transversely and end-to-end across the same in a linear zone at the top of said forward wall and immediately beneath the ceiling of said compartment, said housing laterally adjoining said fan unit and being formed and proportioned to discharge horizontally and rearwardly away from and over a substantial transverse distance across said wall, said housing being provided with internal upright duct subdividing members of unequal length extending along the length of the housing in front-to-rear spaced relation to one another, said duct subdividing members having rearwardly curved ends differently spaced from said fan unit and disposed to discharge air rearwardly and horizontally in uniform distribution along said housing.

References Cited in the file of this patent

UNITED STATES PATENTS

| | | |
|---|---|---|
| 2,058,872 | Heideman | Oct. 27, 1936 |
| 2,116,538 | Mussey et al. | May 10, 1938 |
| 2,251,376 | Ross | Aug. 5, 1941 |
| 2,608,067 | Alexander | Aug. 26, 1952 |
| 2,696,084 | Kirkpatrick | Dec. 7, 1954 |
| 2,740,904 | Goss | Apr. 3, 1956 |
| 2,781,642 | Jacobs | Feb. 19, 1957 |
| 2,895,308 | Alward | July 21, 1959 |